United States Patent [19]

Cope et al.

[11] 3,779,768

[45] Dec. 18, 1973

[54] FLUOROCARBON SURFACTANTS FOR VESICULAR FILMS

[75] Inventors: Oswald James Cope, Santa Cruz; Saul W. Chaikin, Menlo Park, both of Calif.

[73] Assignee: Xidex Corporation, Sunnyvale, Calif.

[22] Filed: Aug. 26, 1971

[21] Appl. No.: 175,348

Related U.S. Application Data

[63] Continuation-in-part of Ser. No. 55,976, July 17, 1970, abandoned.

[52] U.S. Cl. .................. 96/75, 96/48 R, 96/48 HD, 96/49, 96/88, 96/87 R, 96/91 R, 96/91 D, 96/91 N, 96/115 R

[51] Int. Cl. ........ G03c 1/52, G03f 7/08, G03c 1/76

[56] References Cited

UNITED STATES PATENTS

| | | | |
|---|---|---|---|
| 3,355,295 | 11/1967 | Priest | 96/91 |
| 3,260,599 | 7/1966 | Lokkew | 96/49 X |
| 2,703,756 | 3/1955 | Herrick et al. | 96/49 |
| 3,108,872 | 10/1963 | McMahon | 96/49 X |
| 3,169,869 | 2/1965 | Hendrickx et al. | 96/75 X |
| 3,032,414 | 5/1962 | James et al. | 96/75 X |
| 3,622,333 | 10/1971 | Cope | 96/75 |
| 3,120,437 | 2/1964 | Lindquist | 96/49 |
| 3,295,974 | 1/1967 | Erdmann | 96/115 X |
| 3,498,786 | 3/1970 | Notley et al. | 96/49 X |
| 3,549,376 | 12/1970 | Roos | 96/49 X |
| 3,520,683 | 7/1970 | Kerwin | 96/91 N X |
| 3,591,378 | 7/1971 | Altman | 96/91 N X |
| 3,615,538 | 10/1971 | Peters et al. | 96/91 N X |

OTHER PUBLICATIONS

Guenther et al., I & EC Prod. Research & Development, Vol. 1, No. 3, Sept. 1962, pp. 165–169.

Barditch, Electro–Technology, Aug. 1962, pp. 12–13.

*Primary Examiner*—Charles L. Bowers, Jr.
*Attorney*—Townsend & Townsend

[57] ABSTRACT

Fluorocarbon surfactants are added to vesicular films to improve the sensitivity thereof, while further maintaining very small vesicle size in the development image which results in films of improved resolution. The fluorocarbon surfactants contain a hydrophobic chain, which terminates in a hydrophilic head portion, which can be any of the types usually employed with hydrocarbon type dispersing agents.

11 Claims, No Drawings

FLUOROCARBON SURFACTANTS FOR VESICULAR FILMS

This is a continuation-in-part of Patent Application Ser. No. 55,976, filed July 17, 1970 now abandoned.

This invention relates to vesicular filsm. More particularly, this invention relates to vesicular films having incorporated therein a fluorocarbon surfactant, the incorporation of said surfactant resulting in films of increased sensitivity and resolution.

Vesicular films consist essentially of a light-sensitive material dispersed uniformly throughout a polymeric vehicle which is itself coated upon a suitable film base. On image-wise exposure to a source of light, such as actinic radiation, the light-sensitive component decomposes to give gas-forming molecules. The film is then heated to its softening point and the gas-forming molecules aggregate and expand to form bubbles in the film. The bubbles so formed reflect light to reproduce the copied image.

In general, diazonium compounds are usually employed in vesicular film as the light-sensitive material, decomposing to liberate nitrogen gas upon exposure to light. The polymeric vehicles employed exhibit very low permeability towards nitrogen. Examples of suitable polymers include vinylidene chloride homopolymer and its copolymer with acrylonitrile, methacrylonitrile homopolymer, poly (vinyl formal) and poly (hydroxy ether) derived from dihydroxyphenols and epichlorohydrin. In the preferred embodiment of this invention a vehicle is utilized which is a linear poly (hydroxy ether) of an epichlorohydrin and 2,2'-bis(p-hydroxyphenyl) propane. For a more complete description of poly (hydroxy ether) vehicles, see copending U. S. Pat. Application Ser. No. 866,753, filed Oct. 15, 1969, now U.S. Pat. No. 3,622,333 and incorporated herein by reference.

As the nitrogen bubble is the basic light scattering particle, it is necessary to be able to control the size and size distribution of these bubbles in order to control the optical characteristics of the final vesicular film. Bubble size should be large enough to reflect light yet small enough to provide a film of high resolution.

The size of the bubbles can be controlled to some degree by adjusting the development temperature. Thus, at lower temperatures, the polymer vehicle is more viscous and resists the deformation required for bubble formation, hence, inhibiting bubble growth. Conversely, as the polymer softens at higher temperatures, larger deformations are possible, which accounts for the larger bubble sizes observed under such conditions.

Although smaller bubble size and consequently higher resolution can be obtained at relatively low temperatures for a given polymer vehicle, it has been observed that vesicular films developed at the low end of their development temperature range exhibit inferior image stability at elevated temperatures and high humidities. Also, low development temperatures make inefficient use of the available nitrogen—the gas forms small bubbles but in the same numbers as the larger bubbles formed at higher development temperatures so that there is a net decrease in the overall gas volume generated.

It is therefore desirable to control bubble size and distribution by some means other than that of resorting to lower development temperatures. Such an approach would be to provide a controlled number of nucleation sites at which nitrogen bubble formation would take place. The more nucleation sites available for a given amount of nitrogen released during exposure, the smaller the size of the resulting bubbles, and hence the greater the resolution.

In accordance with the present invention, it has been found that bubble size and distribution may be controlled by the incorporation of a fluorocarbon surfactant into the polymer vehicle to thereby improve resolution. It has also been found that the presence of the fluorocarbon surfactant increases film sensitivity.

Suitable fluorocarbon surfactants include those which have a hydrophobic non-polar tail portion, i.e. a long fluorocarbon chain, and terminate in a hydrophilic "head" portion selected from any of the types commonly employed with hydrocarbon type dispersing agents. Generally, any surfactant having a highly fluorinated hydrophobic component may be used in this invention. Though the presence of some unfluorinated carbons in the hydrophobic portion is tolerable, the greater the degree of fluorination, the greater the degree of effectiveness of the surfactant employed. Suitable fluorocarbons include those of the general formulae:

$$CF_3(CF_2)_n\text{---}X$$

$$CF_3(CF_2)_x\left(CF_2-\underset{\displaystyle CF_3}{\underset{|}{CF}}\right)_y\text{--}X$$

$$CF_3(OCF_2CF_2)_n\text{---}X$$

$$CF_3(O(CF_2)_3)_n\text{---}X$$

where $n$ is greater than 4, and preferably 7-50, $x$ is greater than 1, $y$ is greater than 1, and $x+y$ is greater than 4, preferably less than 50, and X is the hydrophilic head. The head portion is either organic or inorganic, and may be an anionic, cationic, nonionic or amphoteric group. It may also be water or oil soluble.

Anionic groups include carboxylate ions such as occur in sodium oleate, and the like derived from sulfuric and sulfonic acids, $—H_2PO^-$ groups, etc. Cationic groups include those derived from tertiary amine salts having the general formula $—\overset{+}{N}R_3x^-$ (where $x^-$ is an anion such as $Cl^-$) such as $—\overset{+}{N}(CH_3)_2CH_2\phi X^-$; groups derived from quaternary ammonium compounds, guanidine, thiuronium salts, etc. Non-ionic groups include such organic groups as $—CH_2OH$, $—COOH$, and the like. Amphoteric groups include those derived from the amino acids. The hydrophilic groups may be attached either directly to the hydrophobic tail or may be attached through an intermediate group such as an ester, ether, or amide, etc.

Suitable commercially available surfactants are the FLUORAD surfactants (FC designations) made by the 3M Company. These surfactants are described in 3M literature as having a stable fluorocarbon tail and a solubilizing group Z.

$$CF_3(CF_2)_n —z$$

This solubilizing group can be either organic, or inorganic, and is either anionic, cationic, non-ionic, or amphoteric. Particularly preferred is FC 170, a non-ionic fluorocarbon surfactant which will reduce the surface tension of water to 25 dynes per cm at 25°C. for a 0.001 wt. percent solution. FC 170 is an N-polyoxyethylene substituted perfluorosulfonamide of the formula:

$$C_8F_{17}SO_2\overset{R}{N}(C_2H_4O)_nH$$

in which R is ethyl and $n$ is an integer from 2–30. FC 170 and closely related N-polyethylene substituted perfluorosulfonamides of the same formula in which $n$ equals 2–30 and R is lower alkyl represent a preferred class of fluorocarbon surfactants for use in the present invention. In general, the preferred class of perfluorosulfonamides will reduce the surface tension of water from 2 dynes per cm to less than 30 dynes per cm at a concentration of 0.01 wt. percent at 25°C.

Other suitable fluorocarbon surfactants include the fluoroalkyl phosphate commercially available under the name ZONYL S-13 (made by Dupont) and compositions of the formula:

$(XCF_2CF_2O(CFXCF_2O)_nCFXCH_2O)_2PO(OM)$ wherein X is F or $CF_3$—n=1–8, and M is a water solubilizing cation (see U. S. Pat. No. 3,492,374). Suitable substituted fluorocarbon surfactants are described by Guenthner, et al., "Surface Active Materials from Perfluorocarboxylic and Perfluorosulfonic Acids", *Industrial and Engineering Chemistry*, Vol. 1, No. 3, Sept. 1962, pp. 165–169. The N-substituted perfluorosulfonamides described in this publication are particularly useful in the present invention, which includes the commercial product FC 170 noted above.

In the formulations of this invention, about 4–6 percent by weight of the light-sensitive compound is preferably added to the polymer vehicle. The concentration of the light-sensitive compound may be as little as 1 percent by weight and may be increased to over about 10 percent by weight. However, the use of such higher levels does not result in commensurate improvement in film sensitivity or resolution and at concentrations of about 20 percent by weight and above, precipitation from solution tends to take place.

The effective concentration of the surfactant will vary according to the solvent system, diazo type and concentration, and type of polymer vehicle employed. While any amount which is effective for increasing film sensitivity and resolution is contemplated, the fluorocarbon surfactant will usually constitute about 0.01–5 percent by weight of the polymeric vehicle and preferably about 0.05–2 percent by weight thereof.

The vesiculating agents used in the films of this invention are sensitive to radiation, usually light, so that exposure to the radiation causes decomposition and formation of nitrogen. Examples of suitable vesiculating agents include the following:

p-diazo-diphenylamine sulfate
p-diazo-dimethyl aniline zinc chloride
p-diazo-diethyl aniline zinc chloride
p-diazo-ethyl-hydroxyethyl aniline ½ zinc chloride
p-diazo-methyl-hydroxyethyl aniline ½ zinc chloride
p-diazo-2,5-diethoxy-benzoyl aniline ½ zinc chloride
p-diazo-ethyl-benzyl aniline ½ zinc chloride
p-diazo-dimethyl aniline borofluoride
p-diazo-2,5-dibutoxy-benzoyl aniline ½ zinc chloride
p-diazo-1-morpholino benzene ½ zinc chloride
p-diazo-2,5-dimethyoxy-1-p -toluyl-mercapto benzene ½ zinc chloride
p-diazo-3-ethoxy-diethyl aniline ½ zinc chloride
2,5,4'-triethoxy-diphenyl-4-diazonium oxalate
p-diazo-diethyl aniline ½ zinc chloride
p-diazo-2,5-dibutoxy-1-morpholino-benzene chloride zinc chloride
p-diazo-2,5-dimethoxy-1-morpholino-benzene chloride zinc chloride
p-diazo-2,5-diethoxy-1-morpholino-benzene chloride ½ zinc chloride
2-diazo-1-napthol-5-sulfonic acid
p-diazo-diethyl aniline borofluoride
p-diazo-2-chloro-diethyl aniline ½ zinc chloride.

Other suitable light-sensitive nitrogen forming compounds include the quinone-diazides

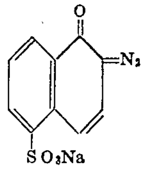

and azide compounds of the type

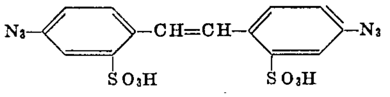

Also useful are the carbazido (carboxylic acid azide) compounds containing a hydroxyl or amino-group in the position ortho to the carbazido group, described in U. S. Pat. No. 3,143,418.

Consistent with the prior art procedures, the preferred technique is to formulate the polymer vehicle and the materials to be disposed therein, such as the vesiculating agent and surfactant in suitable solvents. While the invention is applicable to any polymeric vehicle which has the necessary gas permeability and other properties suited for a vesicular film, the vehicle selected is preferably dry-water-resistent, water insoluble and non-water swelling, as distinguished from the older vehicles such as gelatin, which are water swellable.

The polymer vehicle can be dissolved in a wide range of solvents. Such include methyl ethyl ketone, tetrahydrofuran, dioxane, 2-ethoxyethylacetate, chlorinated solvents such as ethylenedichloride, toluene and blends of solvents such as methyl ethyl ketone/butanol/toluene. Where a diazo compound is used as the vesiculating agent, the diazo compound is preferably dissolved in a small quantity of polar solvent such as methanol, aqueous methanol, acetonitrile, or nitromethane and added dropwise to the stirred polymer vehicle. It is preferred, but not necessary that the solvent in which the diazo compound is dissolved be compatible with the solvent selected for the polymer vehicle. When the two solvents are compatible, the possibility of the diazo compound or the polymer precipitating out on mixing of the two solutions is minimized.

The fluorocarbon surfactants can be dissolved in a wide range of solvents. In general, the preferred solvents are polar and/or have good hydrogen bonding characteristics. It is desirable that these solvents have a boiling point in the range of 50°–160°C. Particularly preferred solvent systems consist principally of one or more of the following solvents: alcohols containing one or more carbon atoms, preferably no more than 5, such as methanol, ethanol, propanol, etc., alcohol-ethers such as those of the formula $C_nH_{2n+1}OCH_2CH_2OH$, where n=1–5; esters such as those of the formula $CH_3COOC_nH_{2n+1}$, where n=1–5; ether esters such as those of the formula $C_nH_{2n+1}OCH_2CH_2CH_2OCOCH_3$, where n=1–5, cyclic ethers such as 1,4-dioxane and tetrahydrofuran; ketones such as those of the formula $C_xH_{2x+1}$ $COC_yH_{2y+1}$ where both $x$ and $y$ are 1–5; nitroalkanes of the general formula $C_nH_{2n+1}NO_2$, where n=1–4; chlorinated hydrocarbons such as ethylene dichloride, and chlorinated hydrocarbons in which the molar ration of chlorine to carbon is greater than unity, e.g. chloroform, methylene chloride, trichloroethylene, trichloroethanes, tetrachloroethanes, and the like including 2,2-dichlorodiethylether and chlorobenzene; and miscellaneous solvents such as dimethylformamide, acetonitrile and tetramethylurea.

In order to indicate more fully the nature of the present invention, the following specific examples are set forth. It will be understood that these examples are presented for illustrative purposes only and that they are not intended to limit the scope of the invention in any manner.

EXAMPLE 1

Several types of surfactants and dispersing agents commonly used with vesicular films for improving, leveling and flow-out of the coating mix are formulated in a poly-(hydroxy ether) polymer vehicle derived from bisphenol A and epichlorohydrin and their effect on the film sensitivity and bubble size, i.e. resolution compared.

To 18.75 g of 20 percent solution obtained by diluting Shell's Eponol 55B (40 percent solids in methyl ethyl ketone) with tetrahydrofuran (a methyl ethyl ketone/tetrahydrofuran ratio of 75:25), is added dropwise a solution obtained by dissolving 0.15 g. of p-diazo-N,N-diethylaniline zinc chloride in 1.80 g. of methanol. To this solution is added 0.75 g. of a 5 percent solution containing the surfactant.

The diazo compound is dissolved in methanol or dimethyl formamide, the solvent selected depending upon the compatibility of this solution with the surfactant solution. The combined solution mixture is added dropwise to the polymer, and stirred continuously for a 10 minute period. The film is then cast on 3 mil. thick biaxially oriented polyethylene terephthalate (Dupont's Mylar) using a 6 mil. clearance Bird applicator, and dried in a forced air oven for 10 minutes at 90°C. The dried films are immersed into distilled water maintained at 70°C. for 30 seconds and then wiped dry. The resultant films are then exposed through a Kodak No. 3 step tablet for 30 seconds to two parallel General Electric F65/UBL 80 watt fluorescent tubes situated two inches from the tablet surface.

The exposed films were developed immediately by passage through a Canon Kalfile developer (Model 100) set at 90°C. The developed samples were examined under a high powered (X900) microscope to determine the size and distribution of the vesicles. In addition, the optical density of each step was measured using a MacBeth transmission densitometer (Model TD-205 modified to give an f 4.5 aperture).

The optical density measurements are shown in Table I for a series of vesicular films prepared as described above and using the different dispersing agents shown.

TABLE I.—OPTICAL DENSITY

| Step number | 1 | 2 | 3 | 4 | 5 | 6 | 7 | 8 |
|---|---|---|---|---|---|---|---|---|
| Dispersing agent: | | | | | | | | |
| None | 0.28 | 0.10 | 0.06 | | | | | |
| Sodium lauryl sulfate (Avirol 116) | 0.90 | 0.55 | 0.25 | 0.10 | 0.05 | | | |
| Sodium dioctyl sulfosuccinate (Santex T14) | 0.90 | 0.40 | 0.24 | 0.14 | 0.05 | | | |

TABLE I.—OPTICAL DENSITY—Continued

| Step number | 1 | 2 | 3 | 4 | 5 | 6 | 7 | 8 |
|---|---|---|---|---|---|---|---|---|
| Dispersing agent (continued): | | | | | | | | |
| Stearyl dimethyl benzyl ammonium chloride (Triton X-400) | 0.50 | 0.25 | 0.10 | 0.06 | | | | |
| A polyether based on alkoxylated triols (Pluradot HA430) | 0.30 | 0.10 | 0.07 | | | | | |
| Saponin (reagent grade) | 1.08 | 0.72 | 0.40 | 0.26 | 0.18 | 0.10 | 0.10 | |
| Sodium alkylnaphthalene sulfonate (Nekal BA-75) | 0.40 | 0.20 | 0.10 | 0.06 | 0.05 | | | |
| Soya lecithin (refined) | 1.44 | 1.00 | 0.40 | 0.10 | | | | |

As step 1 of the step tablet is transparent, each succeeding (higher numbered) step increasingly opaque, the step 1 optical density measurement represents the maximum image density possible for the particular film at the given exposure. It can be seen that the surfactants to varying extents improve the optical density.

Film sensitivity is a relative indication of the amount of light necessary to develop a film to a given density. The greater the film sensitivity, the less light required to develop the film. Alternatively, the more sensitive the film the denser the resultant film image for a given exposure. From the table it is also apparent that the surfactants increase sensitivity, as at a given exposure the film images exhibit greater density.

Microscopic examination of the vesccles produced in all these samples reveals a very wide distribution of vesicle sizes ranging from less than 0.5 microns to greater than 5.0 microns within each sample. This represents an undesirable situation as the larger bubbles tend to lower the ultimate resolution of the vesicular image. Moreover, the presence of large bubbles indicates an inefficient use of the nitrogen generated.

By way of comparison, it has been found that the incorporation of fluorocarbon surfactants not only produces significant increases in sensitivity, but does so while maintaining very small (0.5 micron or smaller) vesicle size in the developed image, thereby, providing improved resolution. The comparison is illustrated in the following example.

EXAMPLE 2

The effect on film resolution and optical density resulting from the incorporation of the non-ionic fluorocarbon surfactant Florad FC-170 was determined for 3 different vesicular films, i.e. different vehicles; namely (1) Shell's Eponol 55, a poly (hydroxy ether) derived from bisphenol A and epichlorohydrin, Monsanto's Formvar 7/95S, a poly (vinyl formal), and (3) Dow's Saran F 120, a vinylidene chloride — acrylonitrile copolymer. Solutions of polymer, solvent and nitrogen liberating substance were prepared as an Example 1.

The Formvar base solution was prepared by dissolving 3.75 of Formvar 7/95S in 27.50 g. of ethylene dichloride and adding dropwise, a solution of 0.15 g. of the diazo compound in 1.80 g. of methanol. The surfactant was added as a 5 percent solution (0.75 g.) in methyl ethyl ketone.

The Saran base solution was prepared by dissolving 3.75g. of Saran E/120 in 21.25 g. of methyl ethyl ketone and adding thereto 9.15 g. of the diazo compound in 1.80 g. of methanol. The surfactants were added as 5 percent (0.75 g.) solutions FC-170 in methyl ethyl ketone and Saponin in water. The Eponol base solution was prepared in the same manner, the FC–170 being added as a 5 percent solution in methyl ethyl ketone.

The films once prepared were coated, dried, water treated and then exposed and developed in the manner described in Example 1. Resolution determinations were carried out by exposing the films through a contacting U.S.A.F. target No. 8007P (made by W & LE Gurley, Inc.) to collimated U. V. radiation from a microscopic light (American Optical Company, Model 370) located 12 inches from the sample for 20 seconds. Development was carried out at 70°C. for the Eponol and Formvar based films and at 120°C. for the Saran based film.

TABLE II

| Polymer vehicle | Surfactant | Resolution, lines/mm. | 1 | 2 | 3 | 4 | 5 | 6 | 7 |
|---|---|---|---|---|---|---|---|---|---|
| Formvar 7/95S | None | 64 | 1.10 | 0.76 | 0.40 | 0.14 | 0.06 | | |
| | Surfactol 318 ethylene oxide modified castor oil | 51 | 1.25 | 0.85 | 0.45 | 0.16 | 0.10 | 0.06 | |
| | FC 170 | 90 | 1.54 | 1.30 | 0.62 | 0.18 | 0.08 | 0.06 | |
| Saran F120 | None | 81 | 1.48 | 1.02 | 0.45 | 0.14 | 0.06 | | |
| | Saponin(reagent) | 81 | 1.48 | 1.12 | 0.54 | 0.18 | 0.06 | | |
| | FC 170 | 144 | 1.56 | 1.40 | 0.70 | 0.23 | 0.10 | 0.06 | |
| Eponol | None | 28 | 1.20 | 1.10 | 0.63 | 0.06 | | | |
| | Aerosol A103* | 32 | 1.22 | 0.82 | 0.50 | 0.30 | 0.16 | 0.07 | |
| | FC 170 | 90 | 1.58 | 1.32 | 0.80 | 0.62 | 0.31 | 0.16 | |

* American Cyanamid's disodium ethoxylated nonyl phoenl half ester of sulfosuccinic acid.

The U.S.A.F. target, used herein is laid over the films to be tested and then subjected to image-wise exposure. The target is opaque and has a series of lines of different width through which light may pass. After exposure, the regular film is developed and the image viewed under a microscope. Resolution, a measure of the ability of the film to reproduce detail, is determined by reference to the finest line (reported as lines per mm) which is reproducible by the film. With vesicular films, the smaller the bubble size, the greater the resolution.

It is seen from the above reported results that films containing FC 170 exhibit relatively superior resolution. Mircoscopic examination of these FC samples showed consistently small vesicle size (0.5 microns or less). The incorporation of the fluorocarbon surfactants also leads to significant increases in optical density for a given exposure as compared to films without a dispersing agent or films containing hydrocarbon dispersing agents. That is, the incorporation of fluorocarbon surfactants increases sensitivity (a more sensitive film producing a denser image at a given exposure).

The use of surfactants in vesicular films is not new. For example, in U.S. Pat. No. 3,260,599, it is disclosed to use Saponin as a wetting agent to improve the coatability of a solution being used for making the vesicular film. For the most part, surfactants have been used to improve leveling and flowout of the coating mix. However, fluorocarbon surfactants have never been used to improve film sensitivity and resolution.

The fluorocarbon surfactants used in this invention differ significantly from the hydrocarbon surfactants previously used with vesicular films in that the fluorocarbons have very low cohesive energy densities, which is reflected in unusually low surface tension and solubility parameters. Also, surfaces coated with fluorocarbons have appreciably lower coefficients of friction than hydrocarbon surfaces.

More particularly, it is believed, though we do not wish to be bound by the following theory, that as organic surfactants have aggragation numbers (i.e. number of molecules per micelle) of 20 to 150, and polyfluorocarbon surfactants have aggregation numbers less than 5, the fluorocarbon surfactants, therefore, dispersed throughout a polymer vehicle will provide at least 4, and up to 30 times more micelles than an equal amount of a hydrocarbon surfactant. These micelles (clusters of surfactant molecules with their common ends facing in) act as nucleating sites for vesicle formation. In the developing (heat softening) state, the micelles are sites of low surface tension, allowing bubble formation in the presence of nitrogen under pressure at these locii. As they expand, they represent pressure sinks and nitrogen in the immediate vicinity feeds the expanding bubble. The larger number of micelles, and consequently of vesicules in a given system, the smaller the size of the resulting vesicles, and hence the greater the film resolution.

It will be appreciated that various modifications and changes may be made in the formulations of the invention, in addition to those described herein, without departing from the spirit of the invention and accordingly the invention is to be limited only by the scope of the appended claims.

What is claimed is:

1. In a vesicular film including a film base having a polymeric vehicle coated thereon and a light-sensitive material dispersed through said vehicle which decomposes to give nitrogen upon exposure to light, wherein said polymeric vehicle is polyvinylidene chloride, homopolymer copolymer of vinylidene chloride and acylonitrile, polymethacrylonitrile, homopolymer poly(vinyl formal) or poly(hydroxyether) derived from dihydroxyphenols and epichlorohydrin, the improvement which comprises an effective amount of a fluorocarbon surfactant in addition to said light-sensitive material dispersed in said vehicle for increasing film sensitivity and resolution, said surfactant being selected from the group consisting of:

$$CF_3(CF_2)_n\text{---}X$$

$$CF_3(CF_2)_x\left(\begin{matrix}CF_2-CF\\ \quad\ \ |\\ \quad\ \ CF_3\end{matrix}\right)_y\text{--}X$$

$$CF_3(OCF_2CF_2)_n\text{--}X$$

$$CF_3(O(CF_2)_3)_n\text{--}X$$

wherein X is an organic nonionic hydrophilic moiety, $n$ is an integer greater than 4, $x$ is an integer greater than 1, and $x+y$ is greater than 4.

2. A vesicular film in accordance with claim 1 wherein said light-sensitive material is a diazo compound.

3. A vesicular film in accordance with claim 1 wherein the fluorocarbon surfactant is present in an amount of about 0.01–5.0 percent by weight of the polymer vehicle.

4. A vesicular film in accordance with claim 2 wherein said diazo compound is present in an amount of about 1–10 percent by weight of said vehicle.

5. A vesicular film in accordance with claim 2 wherein said diazo compound is present in an amount of about 4–6 percent by weight of said vehicle.

6. A vesicular film in accordance with claim 1 wherein said fluorocarbon surfactant is present in an amount of about 0.05 –2.0 percent by weight of said vehicle.

7. A vesicular film in accordance with claim 1 wherein the fluorocarbon surfactant is an N-polyoxyethylene substituted perfluorosulfonamide.

8. A vesicular film in accordance with claim 1 wherein the fluorocarbon surfactant has the formula:

$$C_8F_{17}SO_2\overset{R}{N}(C_2H_4O)_nH$$

wherein R is lower alkyl and $n$ is an integer from 2 –30.

9. A vesicular film in accordance with claim 8 wherein R is ehtyl and the surfactant is capable of reducing the surface tension of water to 25 dynes per cm at 25°C. for 0.001 wt. percent solution.

10. A vesicular film in accordance with claim 1 wherein said polymeric vehicle is a linear poly (hydroxy ether) of epihalohydrin and a dihydric phenol.

11. A vesicular film in accordance with claim 10 wherein said fluorocarbon surfactant is an N-polyoxyethylene substituted perfluorosulfonamide.

* * * * *